United States Patent [19]

Wulf et al.

[11] Patent Number: 4,581,947
[45] Date of Patent: Apr. 15, 1986

[54] LINEAR FORCE MEASUREMENT APPARATUS OR DEVICE

[76] Inventors: Johannes Wulf, Dietrichstr. 107, 4830 Gütersloh 11; Günter Hähne, Wittelsbachstr. 52, 4000 Düsseldorf 12, both of Fed. Rep. of Germany

[21] Appl. No.: 658,495

[22] Filed: Oct. 9, 1984

[30] Foreign Application Priority Data

Oct. 8, 1983 [DE] Fed. Rep. of Germany ....... 3336727

[51] Int. Cl.⁴ .......................... G01L 5/10; G01L 1/22
[52] U.S. Cl. ................... 73/862.48; 73/862.65
[58] Field of Search .......... 73/862.48, 862.54, 862.56, 73/862.65

[56] References Cited

FOREIGN PATENT DOCUMENTS

| 2409372 | 4/1975 | Fed. Rep. of Germany . | |
| 2733569 | 2/1979 | Fed. Rep. of Germany ... | 73/862.65 |
| 0604147 | 8/1978 | Switzerland ..................... | 73/862.65 |
| 1081907 | 9/1967 | United Kingdom ............ | 73/862.48 |
| 0421893 | 3/1974 | U.S.S.R. ........................... | 73/862.65 |

*Primary Examiner*—Charles A. Ruehl
*Attorney, Agent, or Firm*—Karl F. Ross; Herbert Dubno

[57] ABSTRACT

A linear force measuring device for measuring the tension upon a web comprises a measuring ring built into the bearing assembly of a deflection roller over which the web passes. The measuring ring has a pair of slits cut into the ring, the slits having parallel rectilinear portions which are in a perpendicular direction of force application, further portions which extend to the periphery of the ring, and, at each extremity of the rectilinear portion, an inwardly turned portion extending at most 90°.

17 Claims, 1 Drawing Figure

U.S. Patent
Apr. 15, 1986
4,581,947
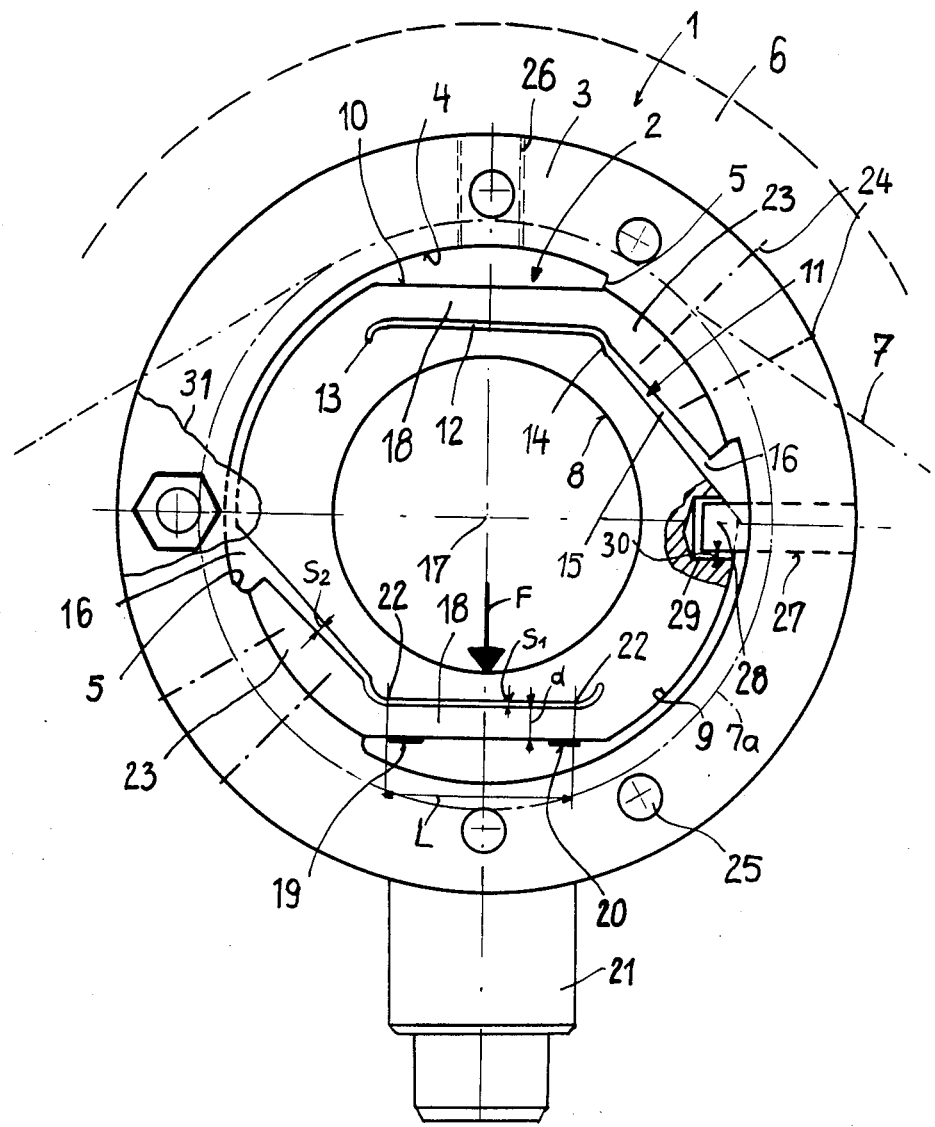

LINEAR FORCE MEASUREMENT APPARATUS OR DEVICE

FIELD OF THE INVENTION

The present invention relates to a linear force measurement device, especially for measuring the tensile stress applied to a web and, more specifically, for incorporation into a roller journaling assembly over which a web of material passes for measuring the stress in this material in terms of the force supplied by the material to this roller. In particular, the invention relates to a measuring ring assembly adapted to receive the bearings or other journaling means of such a roller and to be held, in turn, in the journal block thereof.

BACKGROUND OF THE INVENTION

It is known to provide a roller with a journaling assembly which is capable of measuring the stress applied thereto by a web or strip of material passing over this roller. Such a device or apparatus can include a measuring ring readily supported in a support ring and receiving, in an opening of this measuring ring, the bearings whereby the roller is journaled in a journal block or other support assembly for the roller. The journal block can hold the support ring. Deformation of the measuring ring can be measured, e.g. by a strain gauge, and the force supplied by the web to the measuring ring can thereby be detected and translated into the tensile stress applied to the web.

Such measuring devices can be used in lines, processes and installations for the treatment or manufacture of paper, synthetic resin (plastic), metal or composite material webs. In all such processes and installations, whether they are utilized for coating, treating, shaping or otherwise modifying some property of the material, the web is generally displaced along a transport path and it is important to monitor the stretch of the web or the tensile stress applied thereto so that critical maximum stresses are not applied and, as such stresses are approached, the tensile stress is reduced.

Monitoring systems with this in view are utilized to reduce damage to the web and avoid interruption of the operation of the plant or damage to the equipment or machinery. Obviously, operating costs can be reduced when standstill is avoided by appropriate monitoring of the tensile stress and the prevention of overstressing of the web.

The stretch or tensile stress applied to the web can be monitored by devices of the type described and these devices can be used to generate signals which may be utilized to operate a brake controlling the drag or the drive or control mechanism applying the tractive force to the web or assembly to produce an alarm which signals the approach to a critical threshold of such tensile stress which should not be exceeded.

For example, there is in use the ELMESS web tension measuring device produced by Erhardt & Leimer GmbH, 8900 Augsburg 1, Germany, wherein in at least one journal block of the shaft of a deflection roller for the web a measuring ring assembly is provided of the aforedescribed type.

While this assembly operates effectively, it frequently requires more space than may be available; indeed, in some cases, and this may be its most significant detriment, it may not be capable of achieving sufficient accuracy because of inadequate sensitivity to minor fluctuations in the tensile force applied to the web.

In German laid-open application DE-OS No. 24 09 372, a linear force measuring system is described in which the measuring ring has a measuring segment constituted by two semicircular slits with linearly extended end regions that extend beyond the ends of the semicircle. The measuring zones are the zones between these linear extensions of the semicircular slits and are comparatively narrow or short and have approximately a square configuration or outline. The strain gauges are applied to these zones which deform comparatively slightly so that, when force is applied to the roller by the web, the deformation at these zones sensed by the strain gauges is comparatively little or, put otherwise, the force applied to the roller and hence the tensile stress applied to the web, must be considerable before the deformation of the aforementioned zones of the measuring ring is sufficient to provide significant values to the change in the electrical properties of the strain gauge strips.

As a consequence, this earlier system is likewise insufficiently precise or sensitive to especially small changes in the web traction.

The earlier device, as the German application will reveal, also required axial cutouts which were costly to fabricate, these recesses being necessary to increase the yieldability of the deformation zone. Finally, the arcuate slits which were required in the measuring ring were difficult and expensive to fabricate with accuracy.

OBJECTS OF THE INVENTION

It is the principal object of the present invention to provide an improved apparatus or device for the purposes described which has a measuring ring of significantly lower fabrication cost than the earlier devices described but which nevertheless is highly precise and sensitive.

Another object of this invention is to provide a linear force measuring device utilizing a measuring ring which is of simpler construction, can be utilized effectively over a wide range of forces and for different purposes, provides an especially exact or precise force measurement and is extremely sensitive to even small changes in the applied force.

SUMMARY OF THE INVENTION

These objects and others which will become apparent hereinafter are attained, in accordance with the present invention, in an apparatus of the type describe wherein a support ring radially supports a measuring ring at spaced-apart locations and wherein the measuring ring is formed with a pair of slits which demarcate respective measuring zones having a rectangular configuration, i.e. a thickness that is a fraction of its length and which is extended rectilinearly at diametrically opposite sides of the measuring ring while lying perpendicular to the direction of force application; each of these zones is in the form of a rectangular spring or double-bend bar, i.e. a beam or spring which is braced at one end against the support ring and is connected at the opposite end to the balance of the measuring ring.

A slit defines the beam or spring and includes a rectilinear slit portion lying along a chord of the measuring ring, extends perpendicular to the force application and separates the radially supported portions of the measuring ring from the central part thereof carrying the roller.

At one end the slit extends to the exterior at an obtuse angle to the rectilinear portion. At the opposite end of the linear slit and at the junction of these two slit portions for each rectangular spring or double-bend bar, an arcuate bend or junction is formed. In these junction regions the arcuate slits extend at most over 90°.

It is important to the invention that, at least along one of these rectangular springs outwardly of the measuring ring, at least one strain gauge be provided in the region of at least one of these arcuate bends. Preferably two such strain gauges are provided, one at each end of the rectangular spring corresponding to a respective arcuate bend.

In this construction, the measuring zone is defined by a double-bend bar or beam separated from the remainder of the measuring ring by the linear and arcuate slit portions previously described so that, at both ends and at the outer portions thereof, approximately equal and unusually large stresses can be generated when a load is applied to the measuring ring in a direction perpendicular to the rectangular measuring zone and the portions of the measuring ring that are radially braced against the support ring are, in turn, separated by the chordal slit portions as described.

Indeed, we have discovered that these stresses are extremely sensitive to variations in the force applied and exactly follow variations in the radial force which is applied to the measuring ring as described. Because of the comparatively effective lever arms which are defined by the slits within the measuring ring, even small changes in force can be detected with precision.

Indeed, we have found most surprisingly that the effect of vibration and other perturbations on the measurements is minimal and practically negligible.

The invention is especially suitable for the measurement of tension in a strip which passes over a roller whose journal block is formed with the measuring ring of the invention. In this configuration, it has been found to be advantageous to provide the force-transmitting direction in a vertical plane and thus to provide the two rectangular springs as horizontal springs with the strain gauge strips being applied to the underside of the lower rectangular springs. Both rectangular springs have their outer surfaces defined by chordal planes as well, these chordal planes being parallel to the linear slit portions located between the curved slit portions.

Especially important to the invention is a construction in which the effective length of each of the double-bend beams or rectangular springs is a multiple of the radial thickness thereof. This has been found to ensure a slender measuring element whose stress and hence whose strain gauge output particularly precisely and sensitively reflects force changes and applies these stress changes reliably and uniformly to the respective strain gauge strips.

A symmetrical average value determination and effective elimination or perturbations are obtained with an embodiment in which the double-bend beams lie diametrically opposite one another and each is defined by a short inwardly directed slit portion making a right angle with the linear slit portion of constant width which extends perpendicularly to the diameter, the opposite end of this latter slit being likewise provided with an inward bend and communicating with a slit portion which widens outwardly toward the periphery and includes an obtuse angle with the linear slit portion mentioned previously. The open ends of the progressively widening slit portions also should lie diametrically opposite one another adjacent the cantilevered parts of the measuring ring which are the only parts mounting the latter in the support ring.

Each double-bend beam, therefore, absorbs by its deformation half the force supplied by a load in the central region of the measuring ring which is disposed within the slits. The slits and hence the measuring ring are thereby oriented in axial symmetry.

The two bracing portions by which the measuring ring is secured in the support ring therefore also lie diametrically opposite one another and are connected to the remainder of the measuring ring exclusively by the respective double-bend beams or rectangular springs. A clearance is provided all around the measuring ring, therefore, except for these bracing members. This simplifies the mounting of the measuring ring and ensures that the forces applied thereto will exclusively deform the rectilinear springs and, following the deformation of these springs, that the forces will be transferred to the support by the radial bracing members. The bracing part is, of course, separated by the widening sleeve portion from the central part of the ring. The measuring ring preferably is turned on a lathe, i.e. a lathe turning, while the support is constituted by a ring as previously noted. Other means of support for the measuring ring can be contemplated although they are less advantageous. The bracing parts are secured to the support ring by bolts extending through the support ring and terminating in the bracing parts.

These features make the measuring ring highly precise.

The outer ring can also be provided with inwardly projecting seats of circular arc curvature centered on the axis of the measuring ring and complementary to and accommodating the bracing parts of the measuring ring, these seats projecting inwardly from the inner periphery of the support ring.

This is important since it ensures the definition of the clearance mentioned previously and eliminates all possibility of contact between the measuring ring and the support ring other than at the braced portions. It allows, therefore, a circularly symmetrical measuring ring to be fabricated but nevertheless provides the aforementioned clearance. Naturally, a spurious contact would result in error.

According to a feature of the invention, the measuring ring in the region of the outer sides of the double-bend beams or rectangular springs is flattened so that in this region a crescent-shaped clearance is provided, the flattening being parallel to the rectilinear portion of the slit.

This flattening turns the double-bend beam or rectangular spring into an elongated bar with outer and inner surfaces which are parallel to one another and provides an especially clear place for mounting the strain gauges while guaranteeing high stress uniformity for measurement by the strain gauges.

It is also important to the present invention that the slit width at the rectilinear portion of the slit be less than the slit width below the bracing element associated therewith or, since the width of the slit increases outwardly in this region, the mean slit width in this region.

This ensures that overloading, while initially deforming the end region of the beam, will close the narrower portion of the slit and brace the measuring ring before the wider portion of the slit can close. The closure of the slit is thus progressive.

The widening slit portion can also be rectilinear, thereby greatly facilitating fabrication, especially when the measuring ring is composed of metal and particularly steel, and the slits are formed by electric-discharge machining or some other traveling wire erosion method.

The outer ring can be provided with a terminal for the cable connected to the strain gauges and within the measuring ring the shaft of a deflecting roll for a web can be journaled while the support ring and the measuring ring can be fixed in a journal block of this latter roll and completely closed against the exterior.

One of the advantages of the invention is that the measuring ring and the support ring associated therewith can be utilized in any type of bearing assembly, retaining the form and size of the double-bend beam members. The strain gauges can be provided in the same symmetrical arrangement with respect to the center of the measuring ring and easily positioned with precision. They can be provided on a foil before application to the measuring ring in a pre-production step and applied together with one another to the measuring ring even before the slits are cut in the measuring ring by wire erosion.

BRIEF DESCRIPTION OF THE DRAWING

The above and other objects, features and advantages of the present invention will become more readily apparent from the following description, reference being made to the sole FIGURE of the accompanying drawing which is an end view, partly broken away, of a measuring-ring assembly mounted upon a deflecting roller over which a web passes.

SPECIFIC DESCRIPTION

The apparatus shown in the drawing represents a measuring device 1 for linear force measurement, i.e. the measurement of a tension on a web 7 whose path is changed by passing over a deflecting roller journaled on an axis 17 in the inner seat 8 of a measuring ring which has been generally designated at 2.

The measuring ring 2 is fixed in a support ring 3, the latter being mounted in a journal block shown diagrammatically at 6 and not shown in any detail, it being understood that the measuring assembly 1 is fully supported by this journal block.

When the web 7 is under tension, it applies a force to the deflection roll 7a, shown in phantom lines, in the direction of the arrow F, this component being proportional to the tension.

The outer ring 3, which can be a cast member, has a circular inner periphery 4 which is formed at diametrically opposite locations with inwardly extending projections 5 forming seats that have circular arc surfaces against which bracing members 23 of the measuring ring 2, to be described in greater detail hereinafter, are attached by bolts represented at 24 and extending radially inwardly through the support ring 3.

As noted, the measuring ring 2, which is composed of steel and may be a turning, has an inner bore 8 that receives the shaft advantageously via a bearing.

The outer surface of the measuring ring 2 is also circular and is only interrupted by the mouths of two slits 11 to be described and a pair of flats 10 formed at diametrically opposite locations adjoining the bracing members and defining with the inner surface 4 of ring 3 crescent-shaped gaps and, as will be seen, the rectilinear springs or double-bend beams 18.

More specifically, the measuring ring 2 is provided in axial symmetry with the two slits 11, preferably by traveling wire electrical erosion action and extending axially. Each slit 11 comprises a rectilinear portion 12 of substantial length approximately tangential to an imaginary circle centered on the axis 17 and perpendicular to the direction of force F and terminating at its extremities at inwardly curved slit portions 13 and 14 which extend over at most 90°.

The slit portion 13 terminates blind in the body of the measuring ring 2 while the slit portion 14 communicates with a further slit portion 15 which widens outwardly along a chord to the periphery 9 of the measuring ring 2. The mouth of this slit portion has been represented at 16.

The bent-end portions 13 and 14 of the rectilinear portion 12 of the slit 11 define the ends of the double-bend beam 18 with precision so that, together with the flat 10, a rectilinear spring is formed which is cantilevered to the measuring ring 2 at the end portion 13, but which overhangs an arc of the measuring ring of at least 90°. This region is the region most strongly deformed by the force F. At the end 14 of this cantilevered portion, the bracing member 23 is provided to connect the cantilevered portion to the support ring 3. The rectangular beam 18 has a thickness d which is substantially less than the thickness of this bracing portion 23.

While strain gauges can be provided on both of the flats 10 and frequently a symmetrical arrangement of the strain gauges is desired, in the embodiment shown the strain gauges are provided only along the lower double-bend beam 18 on the exterior thereof, i.e. on its flat 10. The strain gauges have been represented at 19 and 20 in the drawing. These strain gauges, whether two or four are used, are connected in a bridge circuit.

The strain gauge strips 19 and 20 can also be provided along the exterior of the measuring ring 2 at diametrically opposite locations as long as they are provided upon the beams 18 which run perpendicular to the direction of the force F.

The strain gauge strips 19 and 20 are connected by cables in the conventional measuring circuit not described, and to this end a cable connector 21 extends outwardly through the support ring 3 and is anchored in a bore thereof.

The strain gauge strips 19 and 20 are disposed on the outer side of the beam 18 exactly opposite the transition regions represented at 22 between the rectilinear slit portion 12 and the arcuate portions 13 and 14.

The effective length of the beam 18 has been represented by the length L while its radial thickness has been represented at d. The length L is a multiple of the thickness d, i.e. the measuring beam 18 is comparatively slender and constitutes a bar supported at both of its ends, one end against the support ring 3 and at the other end by the central portion of the measuring ring 2, and hence the load causing the distortion of this beam is brought about by the force F and is measured by the strain gauges.

The braced members 23 of the measuring ring 2 are supported in surface contact with the seats 5 and are held in place by the screws or bolts 24 so that the measuring ring 2 cannot move relative to the support ring 3 under the action of the force F apart from the movement of the central region resulting from deformation of the beam 18 to activate the strain gauge strips.

The slit width $S_1$ of the linear slit portion 12 is less than the slit width $S_2$ of the region 15 of the slit which widens to the mouth 16. The width $S_2$ can thus be treated as the mean width of the slit portion 15. This ensures that overloading will be prevented in the manner originally described.

The axial bores 25 in the support ring 3 serve to allow a fastening plate 31 to be secured to the assembly to protect it against external influences. A radial bore 26 diametrically opposite the cable connector 21 allows a further connector to be screwed into the assembly in case strain gauges are provided on the upper flat 10.

A further radial bore 27 is formed in the support ring 3 and receives a security pin 28 which projects with all-around play 30 into the blind bore 29 of the measuring ring 2 and thus takes up any excess stresses to which the measuring ring may be subject. This pin obviously also protects the measuring ring against excess axial forces.

The double-bend beams 18 have the characteristic that, because of their relatively long length and slender configurations, their entire cantilevered assembly tends to bend under the action of the force F, generally in a sigmoid or S-shaped bend with the extremities of the bend portion being clearly defined so that very precise stress measurements can be made without requiring the ends to be excessively stressed. An important advantage of the invention, therefore, is that the measuring ring is very simple and economical and because of the symmetrical arrangements of the slits the deformation of the double-bend beams can follow precise theoretical deformation laws thereof.

It is also possible, in accordance with the invention, to have the mouth 16 of the slits open at the same side of the ring in which case the braced portions 23 will not be disposed on opposite sides of the axis but rather on the same side.

We claim:

1. A device for linear force measurement in a web traveling over a deflection roller in which the device is provided in a bearing assembly of the roller to measure a force perpendicular to the roller, said device comprising:
    a support;
    a measuring ring braced with respect to said support, said measuring ring being formed with a pair of slits having rectilinear slit portions extending parallel to one another and substantially perpendicular to said force, a pair of inwardly bent end portions at the extremities of said rectilinear portion, and a further portion inclined to said rectilinear portion, said end portions being bent through at most 90° arcuately, said rectilinear portions of said slits defining between said extremities, a respective double-bent measuring beam; and
    at least one strain gauge strip affixed to at least one of said beams along a side thereof opposite the respective rectilinear slit portion and substantially at an extremity of said one of said beams.

2. The device defined in claim 1 wherein said beams have lengths between their respective extremities which are multiples of the respective thicknesses thereof.

3. The device defined in claim 2 wherein said further portion of each slit extends substantially to the periphery of said measuring ring and widens in the direction thereof, said slits opening at diametrically opposite sides of said periphery.

4. The device defined in claim 3 wherein said slits separate from a central portion of said measuring ring respective bracing elements, said bracing elements constituting the sole connection between said measuring ring and said support.

5. The device defined in claim 4 wherein said support is a ring provided with a pair of diametrically opposite projections formed with seats complementary and carrying said bracing elements.

6. The device defined in claim 5 wherein said measuring ring is a turning.

7. The device defined in claim 3 wherein each of said beams is provided with a flat externally parallel to the respective rectilinear slit portion and said strain gauge is mounted on one of said flats.

8. The device defined in claim 3 wherein the width of the rectilinear slit portion is less than the mean width of said further portion for each slit.

9. The device defined in claim 3 wherein said further portion of each slit is also linear.

10. The device defined in claim 3 wherein said measuring ring is composed of metal and said slits are formed by wire erosion thereof.

11. The device defined in claim 10 wherein said measuring ring is composed of steel.

12. The device defined in claim 3 wherein said support is a support ring receiving said measuring ring and said support ring is formed with a radial bore receiving a connector for connecting a cable to said strain gauge.

13. The device defined in claim 3, further comprising means for covering said measuring ring to protect it against the environment.

14. The device defined in claim 5 wherein said support ring is provided with a radial pin reaching with play into said measuring ring for preventing overload thereof, a pair of strain gauge strips being provided on one of said beams, at least said one of said beams having a flat externally parallel to the rectilinear portion of the respective slit for receiving said strain gauge strips.

15. The device defined in claim 14 wherein the width of the rectilinear portion of the respective slit is less than the mean width of the said further portion thereof.

16. The device defined in claim 15 wherein said further portion of each slit is linear.

17. The device defined in claim 16 wherein said slits are formed symmetrically with respect to the center of said ring.

* * * * *